United States Patent [19]

Heinrichs et al.

[11] Patent Number: 4,944,923

[45] Date of Patent: Jul. 31, 1990

[54] AUTOCLAVE FOR THE PRESSURE DIGESTION OF SAMPLE MATERIALS IN ANALYTICAL CHEMISTRY

[75] Inventors: Hartmut Heinrichs, Göttingen; Hans-Jürgen Brumsack, Baurat-Gerber-Strasse 3, D-3400 Göttingen; Norman Loftfield, Lange Strasse 22, D-3433 Neu Eichenberg; Nils König, Göttingen, all of Fed. Rep. of Germany

[73] Assignees: Wolfgang Schultz; Hans-Jürgen Brumsack, both of Göttingen; Norman Loftfield, Neu Eichenberg, all of Fed. Rep. of Germany

[21] Appl. No.: 63,123

[22] Filed: Jun. 17, 1987

[30] Foreign Application Priority Data

Jun. 18, 1986 [DE] Fed. Rep. of Germany ....... 3620381

[51] Int. Cl.$^5$ ................................................ B01L 3/00
[52] U.S. Cl. ..................................... 422/102; 422/104; 422/113; 422/295; 422/297; 422/299; 215/243; 215/260; 215/270; 215/283; 215/321; 220/208; 220/316; 220/325; 220/327; 220/356; 220/366
[58] Field of Search ................. 422/99, 102, 104, 113, 422/117, 905, 240–242, 295–297, 299, 302; 215/243, 260, 270, 283, 321; 220/208, 316, 325, 327, 356, 366

[56] References Cited

U.S. PATENT DOCUMENTS

| | | | |
|---|---|---|---|
| 3,483,089 | 12/1969 | Brewer | 422/102 X |
| 3,933,440 | 1/1976 | Woolley | 422/102 |
| 4,228,134 | 10/1980 | Alfio | 422/296 X |
| 4,303,615 | 12/1981 | Jarmell et al. | 422/102 |
| 4,335,074 | 6/1982 | Bernas | 422/102 |
| 4,406,861 | 9/1983 | Beauvais et al. | 422/296 X |
| 4,750,610 | 6/1988 | Ryder | 422/300 X |

Primary Examiner—Barry S. Richman
Assistant Examiner—Lynn M. Kummert
Attorney, Agent, or Firm—Max Fogiel

[57] ABSTRACT

An autoclave useful for pressure digestion of samples for chemical analysis, consisting of a closeable vessel containing the sample, which during operation sustains elevated temperatures and pressures. The autoclave has a PTFE (Teflon) beaker and lid, in direct contact with each other thus forming a tight seal with an excess-pressure release mechanism. The assembled vessel is held in a device that presses the sealing surfaces of the beaker and lid together, through pressure on a metallic lid support disc. The sealing surfaces of the beaker and lid are free-standing, which permits a direct release of excess-pressure and necessitates an extended clamping device for the lid support disc, which is fixed at a single point.

7 Claims, 2 Drawing Sheets

AUTOCLAVE FOR THE PRESSURE DIGESTION OF SAMPLE MATERIALS IN ANALYTICAL CHEMISTRY

BACKGROUND OF THE INVENTION

This invention pertains to an autoclave being used for the pressure digestion of sample material for chemical analysis. It has a closeable vessel to contain the sample, which during operation is exposed to elevated temperatures and pressures. The vessel consists of a PTFE beaker and lid, which have sealing surfaces in direct contact with each other. The necessary pressure of the lid on the beaker is achieved by an extended clamping device which is remote from the seal joint between beaker and lid. This clamping device presses on the metallic lid support disc at only one point. This clamping device, lid/lid support disc, beaker/beaker support tube, and the free-standing lid/beaker act as a simple and effective excess-pressure release mechanism. Pressure digestion autoclaves have been known in diverse forms for a long time. To be mentioned are: W. Wahler (1964) "Mechanische und chemische Aufbereitung von Mineralien and Gesteinen für geochemische Spurenanalysen" Neues Jahrb. Miner. Abh. 101, 109–126; L. Kotz et al. (1972) "Aufschluss biologischer Matrices für die Bestimmung sehr niedriger Spurenelementgehalte bei begrenzter Einwaage mit Salpetersäure unter Druck in einem Teflongefäss" Z. Anal. Chem. 260, 207–209; M. Stoepler and Backhaus (1978) "Pre-treatment Studies with Biological and Environmental Materials" Fres. Z. Anal. Chem. 291, 116–120. In each case a closeable vessel of inert material (e.g. Teflon) is used. The sample under investigation is put into the beaker, and e.g., mineral acids are added after which the beaker is closed with the lid. The vessel is then heated whereupon the sample decomposes, forming a solution which can be further investigated. Since extremely high pressures can develop during decomposition of the sample, the vessel must be enclosed with a pressure safe container. To increase safety an excess-pressure release mechanism may be included.

The main disadvantage of these autoclaves lies in the fact, that due to the high internal pressures a loss of the produced gases is inevitable which, after contacting the metal container may re-enter into the vessel during the cooling phase leading to a contamination of the sample with those elements from which the container is made. Any determination of these elements will then be unreliable.

A further disadvantage is that the pressure safe (metal) container for the vessel also includes a complicated pressure safe closure mechanism which makes the whole unit large, heavy, and difficult to handle. Absolute certainty against undesirable ruptures of such units cannot be achieved, since extremely high pressure peaks can be produced through the reaction of the added acids with the sample of unknown composition. Pressure release valves can help to prevent explosive ruptures, but they require constant maintenance to ensure proper functioning. Furthermore their durability is rather limited by the corrosive vapors to which they may be exposed.

SUMMARY OF THE INVENTION

The intent of this invention was to improve upon the design of previously available autoclaves in a manner which would allow operation at high pressures without compromising safety and which would exclude the possibility of contamination of the sample to be analyzed. This intent was realized by developing a free standing Teflon seal whose joint constitutes an excess-pressure release mechanism whereby the clamping of the lid to the beaker is achieved using a device that widely spans the seal joint and culminates in a point contact between the clamping screw and the lid support disc. Excess pressure within the vessel can be released through the seal joint which eliminates the danger of an explosive rupture of the vessel. The free standing seal also ensures that the released vapors do not contact other materials, such as a metal container, which, during cooling, would permit re-entry of the then contaminated materials into the vessel. With this type of clamping device it is possible to do without a threaded or bayonet containment closure. It is to be emphasized that the sealing surfaces of the beaker and lid are in direct contact, with no intervening gasket, and that this design utilizes the thermal expansion of the beaker/lid material (e.g. Teflon) to achieve the tight seal and to provide the excess pressure release function.

The clamping device includes a clamping screw that makes a one point contact with the lid support disc. Closing the vessel is done by setting the lid (with its support disc) on the beaker (with its support tube), inserting the vessel into the clamping device and hand-tightening the clamping screw. If extremely high pressures do develop, the lid (with its support disc) can pivot on the clamping screw fulcrum permitting a release of excess pressure. Thus the lid (with its support disc) and the clamping screw comprise an extraordinarily simple pressure release valve. The beaker has an enclosing support tube which leaves the seal joint free standing. The beaker material need not be rigid as it is supporteed on its outer side by the support tube. Since the rigidity of the beaker material decreases at elevated temperatures an external support is essential. The pressure safety is not affected by the support tube since the excess pressure is released through the beaker/lid joint.

The beaker has a lip which extends beyond and around the support tube and the lid has a lip which extends beyond and around the sides of the support disc. Thus escaping vapors contact neither the support tube nor the support disc. The support tube and support disc are made of metal or aluminium while the beaker and lid are made of Teflon.

The clamping devicce consists of a base plate, a central column, and a cover plate in which there are several threaded holes for the clamping screws used for the fixation of the individual vessels. Several assembled vessels may be clamped in the clamping device and then be heated at the same time in an oven.

One design of the developed autoclave is to be described in conjunction with the accompanying drawings:

DESCRIPTION OF THE PREFERRED EMBODIMENT

Figure 1:
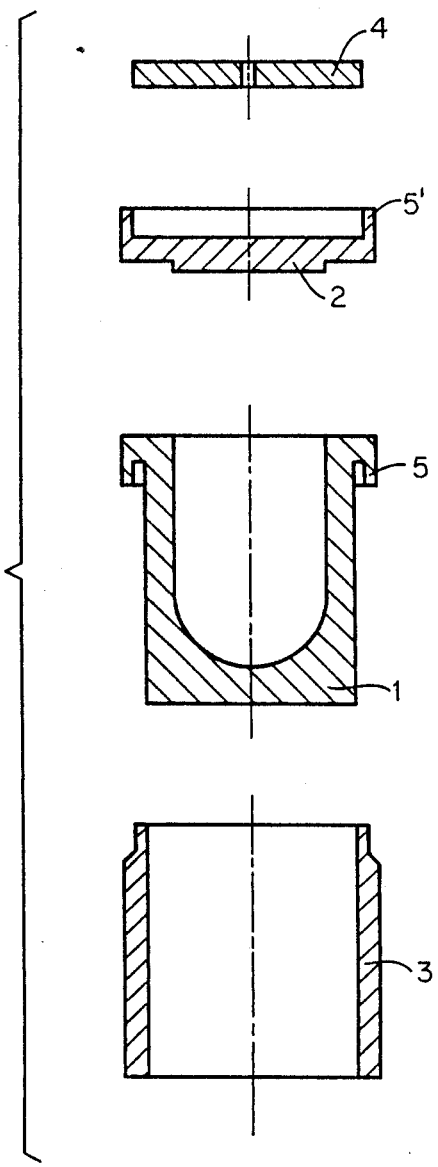
FIG. 1. A cross section of the beaker and lid with their respective supports (support tube and support disc).
Figure 2:
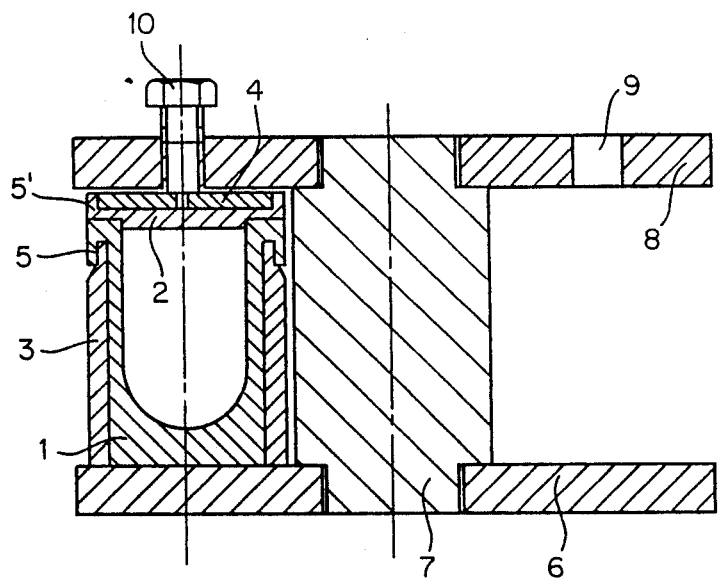
FIG. 2. A cross section of the clamping device containing one assembled vessel at the line II—II of FIG. 3.
Figure 3:
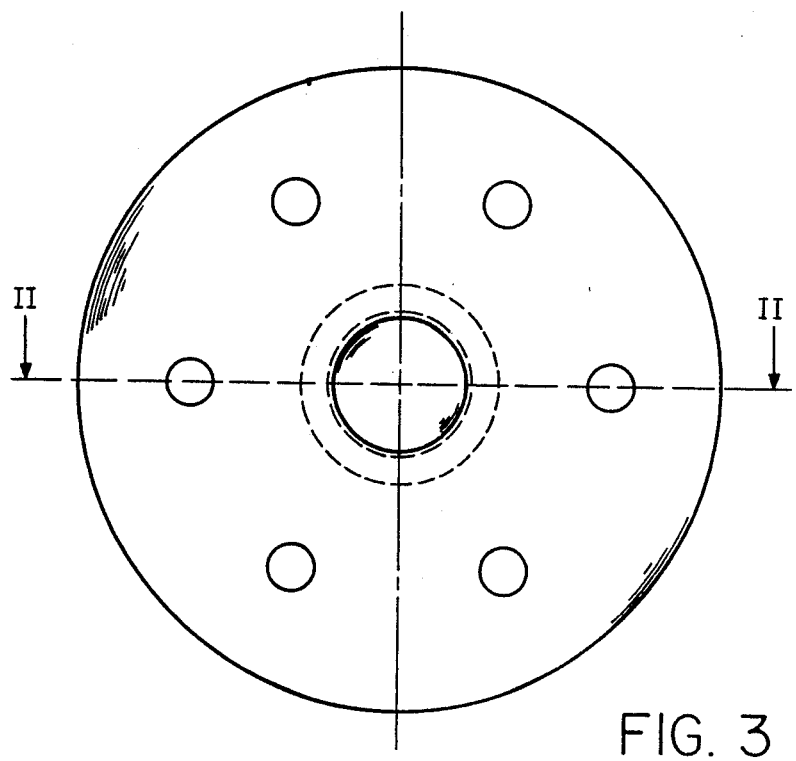
FIG. 3. The clamping device which accomodates 6 vessels as seen from above.

FIG. 1 presents the autoclave vessel in the form of an exploded sketch. The sample to be studied is placed in the beaker (1) whose rim is planar and constitutes one of the sealing surfaces. The beaker is covered with a lid (2) whose opposing surface is also planar, constituting the second sealing surface thus directly closing the vessel. The beaker and lid are made of Teflon so as to resist attack by acid reagents. Because Teflon becomes soft and semi-fluid at elevated temperatures (>200° C.), the beaker is supported by a rigid support tube (3) and the lid is supported by a rigid disc (4) so that the internal forces are borne by these rigid supports. The supports may be made of aluminium. The tube support does not extend as high as the rim of the beaker leaving the rim free. Similarly the lid disc support is smaller in diameter than the lid. Thus the planar sealing surfaces of the vessel are completely free-standing on the outside. Moreover the upper rim of the support tube is completely covered by the lip of the beaker (5), similarly the edge of the support disc is largely covered by the lip of the lid (5'). This design results in a relative increase in the area of inert material (Teflon).

A clamping device (6, 7, 8, 10) is used to secure the sealing surfaces of the beaker and lid. This consists of a base plate (6), a central column (7), and a cover plate (8). The distance between the base plate and the cover plate is such that the assembled vessel (1, 2, 3, 4) can be inserted. Threaded holes (9) are located in the cover plate which are fitted with clamping screws (10). These clamping screws contact the vessel assembly approximately in the middle of the lid support disc (4). The apparatus is used in the following way. The sample being studied is put into the beaker (1) together with the chosen acids or other reagents. The lid (2) is set loosely on the beaker. The assembled vessel with support tube (4) and support disc (5) is inserted into the clamping device from the side. The clamping screw (10) should be approximately over the center of the support disc (4). The clamping screw (10) is then hand-tightened, pressing the lid (2) against the beaker (1). Tools are not necessary to tighten the clamping screw. The complete assembly can now be placed in an oven and heated. Because Teflon has a very high coefficient of thermoexpansion, the beaker and lid press more tightly against each other, thus increasing the ability of the seal to contain higher pressures. In case the interior pressure becomes too high, the Teflon on one side of the seal may be minimally compressed permitting the support disc and lid to pivot on the point of the clamping screw. Excessive pressure is then released through the transient opening in the joint. Thus the beaker, lid, and clamping screw constitute a pressure release valve. The point contact between clamping screw and support disc is especially important in permitting the minimal movement that allows the release of excess pressure. The released gases escape directly into the open; thus on cooling the assembly, escaped materials are not drawn back into the vessel. Inasmuch as the contacting surfaces and the lips (5, 5') on the outside of the vessel are all made of Teflon, contamination of the sample by foreign substances is excluded.

The apparatus is extremely simple in concept, easy to construct, to use and to clean. Use is especially simple since there are no complicated closures. It is lightweight inasmuch as very high pressures are avoided. Because the one point contact between clamping screw and support disc forms an effective pressure release valve, there is no possibility of an explosive rupture of the vessel; safety is accordingly assured. It is to be observed that the support tube and support disc do not have a "pressure containment" function; they are used only to provide mechanical support for the beaker and lid which are made of Teflon.

The above apparatus may take a variety of forms and may be used in a variety of applications. Thus reaction vessels of different sizes are conceivable, the number of vessels per clamping device is variable etc. For example a clamping device for a single reaction vessel is possible. Other materials of appropriate chemical and physical properties are conceivable for both the vessel, the supports and clamping device.

We claim:

1. An autoclave vessel for pressure digestion of samples for chemical analysis, comprising: a closeable beaker containing a sample and sustaining elevated temperatures and pressures during operation; a lid in direct contact with said beaker and forming a tight seal therewith; a metallic lid support disc in contact with said lid; clamping means in contact with said lid support disc and surrounding said beaker and lid for pressing sealing surfaces of said beaker and lid together through pressure on said metallic lid support disc; said sealing surfaces having a periphery in direct contact with outside air to admit outside air free from metallic contaminants into said beaker when said seal is broken due to cooling said vessel after heating thereof; said beaker receiving outside air when said seal is broken for preventing contamination of the sample with metallic constituents; said clamping means applying pressure to said lid through said metallic support disc at a single point to permit said lid to deflect under pressure within said beaker for opening a gap between said sealing surfaces and thereby breaking the seal to relieve the pressure within said beaker through said gap for preventing explosion of said beaker; said periphery being free from confinement by a surrounding wall to prevent permanent deformation of said beaker and lid after said vessel is heated to an elevated temperature and then cooled; said clamping means remaining in place with said lid when pressure within said beaker is relieved through said gap, said metallic lid support disc being a rigid backing of said lid for producing predetermined pivoting action of said lid about said single point to form said gap and prevent destruction of said beaker and lid.

2. An autoclave vessel as defined in claim 1 including screw means in said clamping means, said support disc having a central point contacted by said screw means.

3. An autoclave vessel as defined in claim 1, including an outer support tube enclosing said beaker and leaving said sealing surfaces free so that said periphery remains in direct contact with the outside.

4. An autoclave vessel as defined in claim 3, wherein said support tube has an upper end, said beaker having a lip extending over said upper end of said support tube; said lid having a lip and said support disc having an edge, said lip on said lid extending over said edge of said support disc.

5. An autoclave vessel as defined in claim 3, wherein said support tube and said support disc comprise aluminum.

6. An autoclave vessel as defined in claim 1, wherein said clamping means comprises further a bottom plate, a center column, and a cover plate for holding a plurality of vessels; and a plurality of clamping screws for contacting respective ones of a plurality of support discs of a plurality of vessels at said single point.

7. An autoclave vessel for pressure digestion of samples for chemical analysis, comprising: a closeable beaker containing a sample and sustaining elevated temperatures and pressures during operation; a lid in direct contact with said beaker and forming a tight seal therewith; a metallic lid support disc in contact with said lid; clamping means in contact with said lid support disc and surrounding said beaker and lid for pressing sealing surfaces of said beaker and lid together through pressure on said metallic lid support disc; said sealing surfaces having a periphery in direct contact with outside air to admit outside air free from metallic contaminants into said beaker when said seal is broken due to cooling said vessel after heating thereof; said beaker receiving outside air when said seal is broken for preventing contamination of the sample with metallic constituents; said clamping means applying pressure to said lid through said support disc at a single point to permit said lid to deflect under pressure within said beaker for opening a gap between said sealing surfaces and thereby breaking the seal to relieve the pressure within said beaker through said gap for preventing explosion of said beaker; said periphery being free from confinement by a surrounding wall to prevent permanent deformation of said beaker and lid after said vessel is heated to an elevated temperature and then cooled; said clamping means remaining in place with said lid when pressure within said beaker is relieved through said gap; screw means in said clamping means, said single point being at the center of said support disc, said screw means contacting said single point at the center of said support disc; an outer support tube enclosing said beaker and leaving said sealing surfaces free to contact outside air; said beaker having a lip and said support tube having an upper end, said lip of said beaker extending over said upper end of said support tube; said support disc having an edge, said lid having a lip extending over said edge of said support disc; said support tube and said support disc comprising aluminum, said metallic lid support disc being a rigid backing of said lid for producing predetermined pivoting action of said lid about said single point to form said gap and prevent destruction of said beaker and lid.

* * * * *